United States Patent [19]

Justice

[11] Patent Number: 5,129,502
[45] Date of Patent: Jul. 14, 1992

[54] HELICAL SNAKE

[75] Inventor: James C. Justice, Beckley, W. Va.

[73] Assignee: Coaltex, Inc., Beckley, W. Va.

[21] Appl. No.: 663,465

[22] Filed: Mar. 4, 1991

[51] Int. Cl.$^5$ .......................................... B65G 41/00
[52] U.S. Cl. .............................. 198/303; 198/304; 198/313; 198/668; 198/667
[58] Field of Search ............... 198/303, 313, 668, 672, 198/861.2, 674, 304, 667, 314

[56] References Cited

U.S. PATENT DOCUMENTS

| | | | |
|---|---|---|---|
| 1,689,963 | 10/1928 | Pelton | 198/668 |
| 1,933,404 | 10/1933 | Allen et al. | 198/303 |
| 2,058,125 | 10/1936 | Bean | 198/668 |
| 2,776,040 | 1/1957 | Snyder | 198/303 |
| 3,547,292 | 12/1970 | Sammarco . | |
| 3,701,411 | 10/1972 | McGinnis | 198/303 |
| 3,727,746 | 4/1973 | Slusher . | |
| 4,082,362 | 4/1978 | Justice et al. . | |
| 4,118,072 | 10/1978 | Kelley et al. . | |
| 4,334,818 | 6/1982 | Tingskog | 298/668 X |
| 4,989,176 | 2/1991 | Stuckey | 198/313 X |

FOREIGN PATENT DOCUMENTS

| | | | |
|---|---|---|---|
| 1201727 | 1/1960 | France | 198/668 |
| 1454767 | 1/1989 | U.S.S.R. | 198/668 |
| 1426181 | 2/1976 | United Kingdom | 198/668 |

OTHER PUBLICATIONS

Klockner-Becorit GmbH, Rackinghausen, Federal Republic of Germany Brochure, 1986.

Cincinnati Conveyor Chains Brochure, 1977.

*Primary Examiner*—D. Glenn Dayoan
*Attorney, Agent, or Firm*—Nixon & Vanderhye

[57] ABSTRACT

A self-propelled conveyor includes a number of auger sections each section including at least one spiral mounted on a shaft, a housing surrounding the spiral and having two end terminations, and structure for driving of one spiral by driving an adjacent spiral whether or not the shaft of the spirals are in line with each other. The driving structure can comprise axially and radially extending projections from each adjacent shaft providing a lost motion connection between the shafts, or a universal joint. More than one auger may be mounted in each housing section, with a common drive shaft for the augers connected by a universal connection to a similar drive shaft for an adjacent auger section. The end terminations of the housing allow relative pivotal movement between adjacent housing sections at least in a horizontal plane, and comprise inter-engaging cylindrical section elements allowing relative rotational movement between adjacent housing sections of at least about 15°. Structures are provided for moving in the auger sections, the structures continuously in contact with the mine floor, such as a mining chain having loose connections between the links, or wheels on axles. The conveyor is particularly useful in association with a cutting head of a miner for practicing a method of cutting and conveying mined material from a mine site through a non-linear bore. A drive motor for the auger sections is provided every few auger sections.

15 Claims, 5 Drawing Sheets

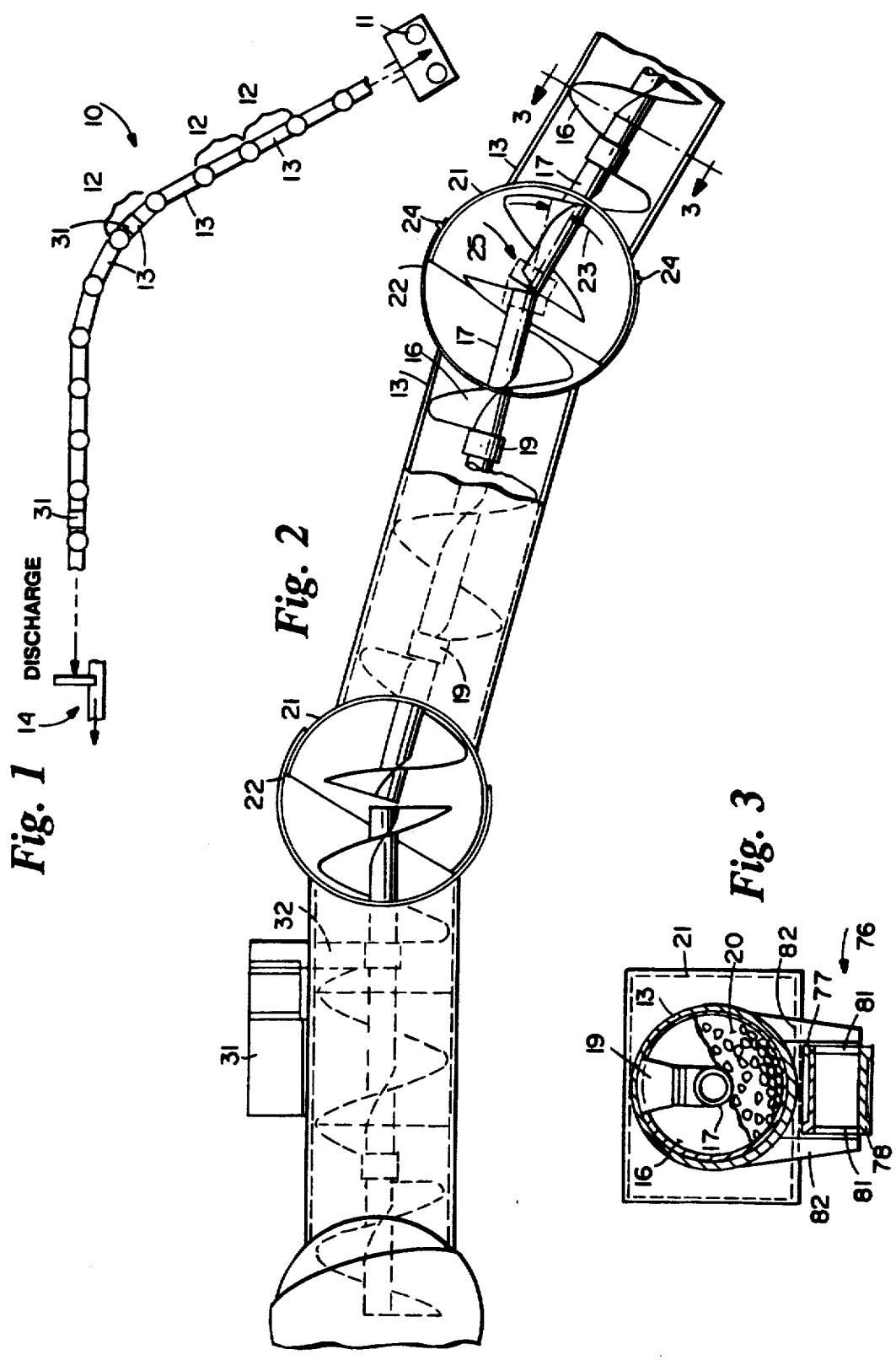

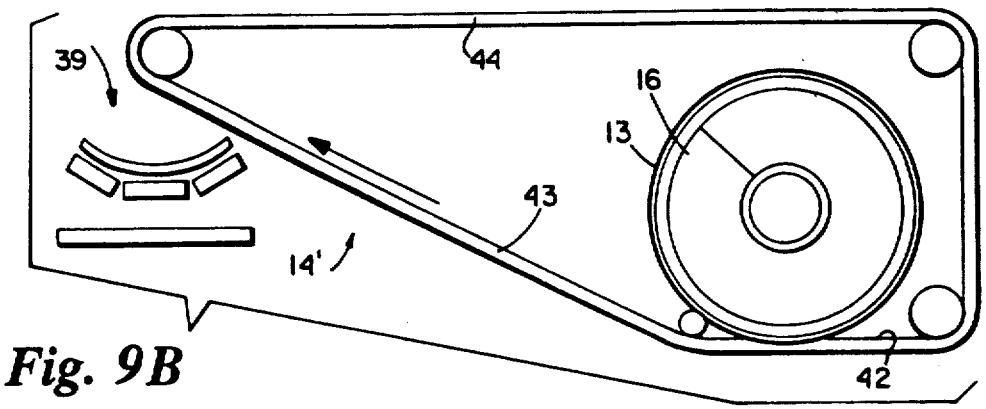
Fig. 9B
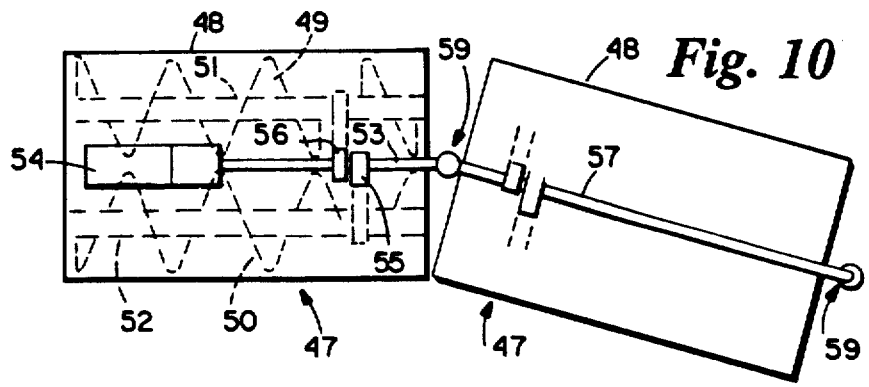
Fig. 10
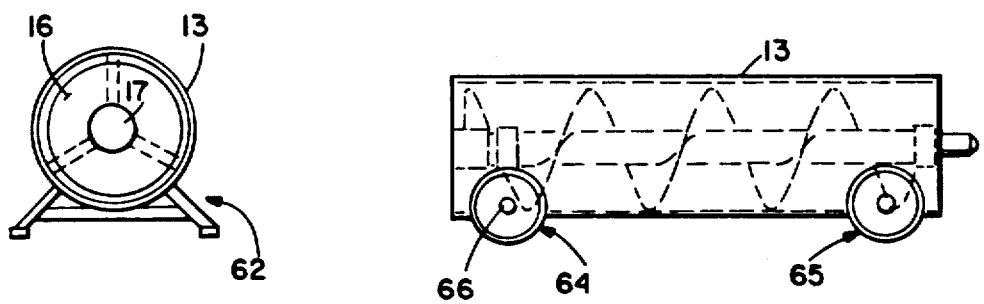
Fig. 12
Fig. 13
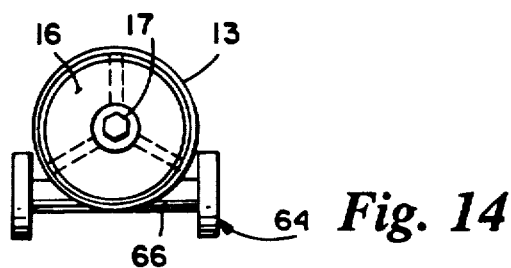
Fig. 14

HELICAL SNAKE

BACKGROUND AND SUMMARY OF THE INVENTION

There are many situations in which auger conveyors can be very useful in view of the relatively high material conveyed to power ratio for augers. However the use of auger conveyors has many times been limited to situations where the bore in a mine in which the auger operates is linear, and/or where the mine bore itself can be effectively utilized to facilitate the conveyance. Where the bore is non-linear, or the bore is significantly larger than the auger sections, auger conveyors have not been as useful.

According to the present invention a self-propelled conveyor, and associated method of mining and conveying material, are provided which utilize the advantageous attributes of an auger in a wide variety of environments. The conveyor according to the present invention is moved under its own power into a bore toward a mine site, or the like, whether or not the bore is linear. The conveyor according to the invention can adjust to a wide variety of bends and turns, yet still effectively convey mined material.

According to one aspect of the present invention, a self-propelled conveyor is provided comprising: A plurality of auger sections, each section comprising a spiral mounted on a shaft, a housing surrounding the spiral and having two end terminations, and means for effecting driving of one spiral by driving an adjacent spiral whether or not the shafts are in line with each other. Means mounted on the auger section housings for facilitating moving the auger section housings. The end terminations allowing relative pivotal movement between adjacent housing sections, at least in a horizontal plane. And, the means for effecting driving of one spiral by driving of an adjacent spiral whether or not the shafts are in line with each other comprises axially and radially extending projections from each adjacent shaft providing a lost motion connection between the shafts. The housing end terminations preferably comprise inter-engaging cylindrical section elements allowing relative rotational movement between adjacent housing sections of at least about 15° in a horizontal plane, and stop means are typically provided for preventing relative rotation beyond a certain point. Bearing means may be provided for mounting the shafts within the housings, the bearing means comprising hang it type bearings so as not to interfere with material conveyance. The drive means for effecting driving of the shafts preferably comprise a plurality of different drives one associated with every few auger sections.

The means mounted to the auger section housings for moving the auger section housings preferably continuously engage the ground. In one embodiment, such means comprise a mining chain with loose connections between links to allow the chain to follow a non-linear path, and sprockets provided at least at the front and rear of the auger sections to effect driving of the chains and thereby a crawler type advancing action of the auger sections into the mine bore. Alternatively, the moving means may comprise at least a pair of wheels mounted on an axle, such as two wheels mounted at a center section of the auger housing with a rub rail bowed outwardly at the center section so as to extend outwardly past the most outward termination of a wheel.

Two (or even more) spirals may be provided within each auger section housing, with a common drive element (e.g. rod) interconnected by a universal connection to a corresponding rod in an adjacent auger section so that driving of the spirals in one housing effects driving of the spirals in an adjacent housing.

According to yet another aspect of the present invention, a method of cutting and conveying mined material from a mine site through a non-linear bore, using a cutting head and a plurality of pivotally interconnecting auger sections is provided. The method comprises the steps of: (a) At the mine site, cutting the material to be mined with the cutting head. (b) Substantially continuously moving the auger sections into the bore toward the mine site. (c) Effecting pivotal movement of adjacent auger sections with respect to each other to conform to the non-linear bore. And, (d) continuously conveying the mined material away from the mine site by rotating the auger sections, which engage and transport the mined material, power for transmitting rotation of one auger section being transmitted to at least one adjacent auger section. Step (d) is preferably practiced by rotating every few auger sections with a power source.

Utilizing a conveyor according to the invention very high conveyance capacities can be achieved. For example for the diameters (spiral diameters) given in the table below, the indicated tons per minute of mined material can be conveyed, assuming a 100 rpm rotation of the auger spirals:

| CONVEYOR CAPACITY | |
|---|---|
| DIAMETER | TPM @ 100 RPM |
| 24 | 8.1 |
| 30 | 16.2 |
| 36 | 28.3 |
| 42 | 45.4 |

The spirals typically operate 50% full (that is the housing is 50% full of coal or other mined material).

It is the primary object of the present invention to provide for the effective conveyance of mined material, or the like, through non-linear bores, with constant conveyor advancement being possible. This and other objects of the invention will become clear from an inspection of the detailed description of the invention, and from the appended claims.

BRIEF DESCRIPTION OF THE DRAWINGS

FIG. 1 is a top schematic view showing the positions of a self-propelled conveyor according to the present invention moving into a mine following a cutting head;

FIG. 2 is a top plan detail view showing a number of auger conveyor sections of the conveyor of FIG. 1 in detail, with the spirals within the auger sections shown in dotted line;

FIG. 3 is a cross-sectional view of one of the auger sections of FIG. 2 taken along lines 3—3 thereof;

FIGS. 9A and 9B are alternative embodiments of exemplary discharge structures from the auger conveyor of FIG. 1;

FIG. 10 is a top plan view of another embodiment of auger conveyor sections according to the invention, with the end terminations of the housing removed for clarity of illustration;

FIG. 12 is an end view of the structure of FIG. 11;

FIG. 13 is a view like that of FIG. 11 only showing two sets of wheels as the structure allowing movement of the auger housing section, and FIG. 14 is an end view of the structure of FIG. 13;

DETAILED DESCRIPTION OF THE DRAWINGS

Figure 4:
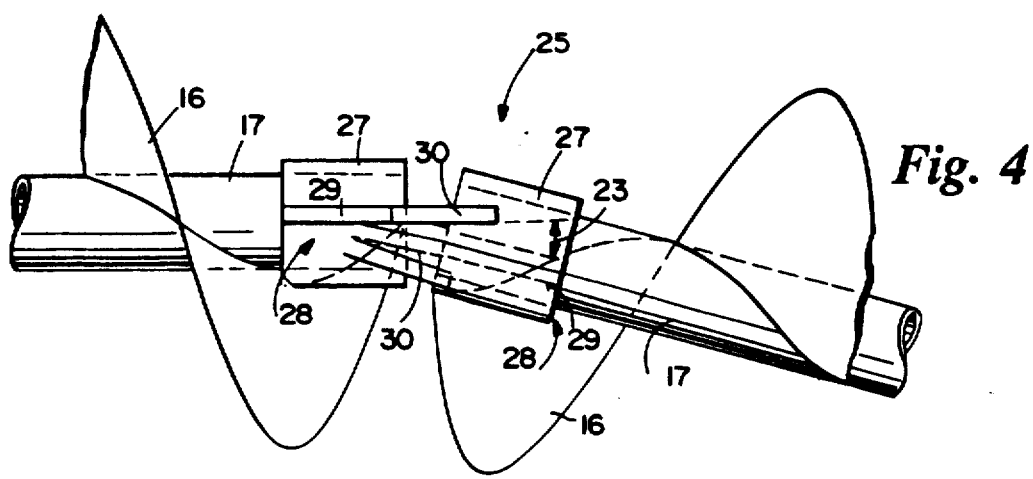
FIG. 4 is a top detail view showing the lost motion interconnection between a pair of adjacent spirals of the auger conveyor of FIGS. 1 through 3 at the 12 o'clock position thereof.
Figure 5:
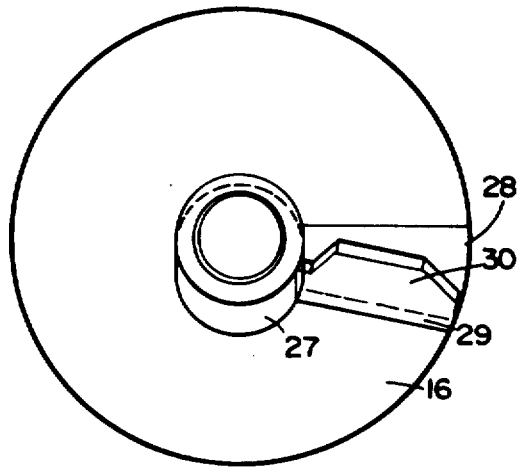
FIG. 5 is an end view of the components as illustrated in FIG. 4.
Figure 6:
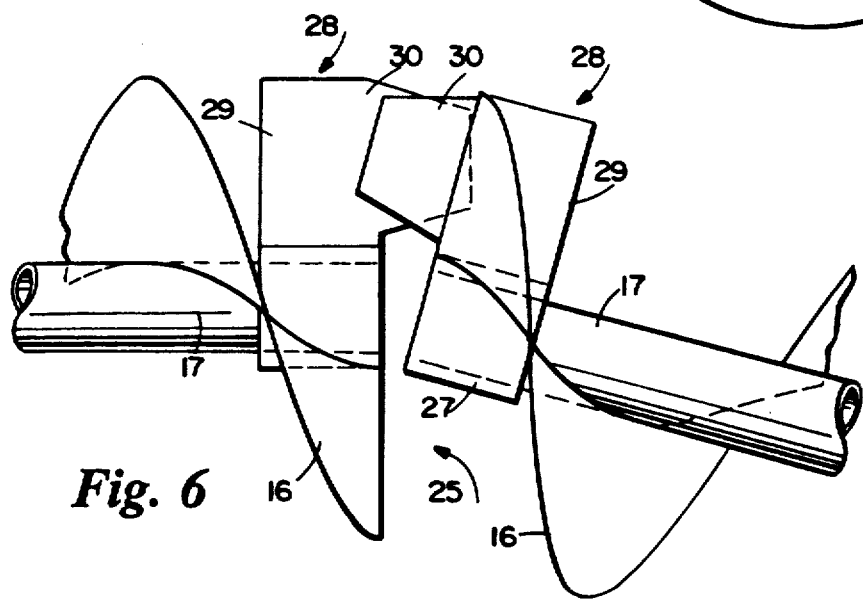
FIG. 6 is a view like that of FIG. 4 only showing the components at a 9 o'clock.
Figure 7:
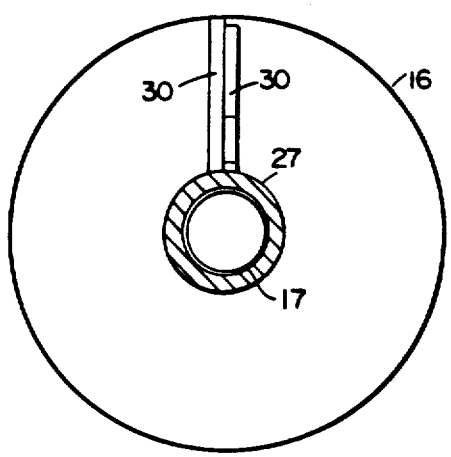
FIG. 7 is a view like that of FIG. 5 only with the components in the 9 o'clock position.

An exemplary conveyor assembly according to the present invention is shown schematically by reference numeral 10 in FIG. 1. The conveyor assembly 10 preferably is connected at the front thereof to a miner cutting head 11. The cutting head can have a wide variety of configurations, but preferably comprises a two-headed cutter that has the capability of flaring the cutter heads out so that mining action can occur during both movement into a mine bore and out from a mine bore. Such a cutting head is shown in U.S. Pat. No. 4,082,362, the disclosure of which is incorporated by reference herein. The conveyor assembly 10 includes a plurality of auger sections 12, each including a housing 13, and also preferably is associated at the end thereof opposite the cutting head 11 (that is at the mine mouth) with a discharge conveyor assembly 14. Each auger section 12 comprises at least one spiral 16 mounted within the housing 13 on a shaft 17. Bearings for the shaft 17 are provided preferably at two points within the housing 13 by conventional hanging bearings 19 (see FIG. 3) which do not interfere with the conveyance of the coal or other mined material 20 being conveyed by the spiral 16. During conveyance coal 20 takes up about one half of the interior volume of housing 13, as seen in FIG. 3.

Each housing 13 preferably has first and second end terminations 21, 22. As seen most clearly in FIG. 2, the end terminations preferably comprise inter-engaging cylindrical section elements which allow relative rotational movement between adjacent housing sections 13 of at least about 15° (see angle 23 in FIG. 2) in a horizontal plane (that is about a vertical axis). Stop lugs 24 preferably are provided for positively stopping relative movement between the cylindrical sections 21, 22 beyond a certain point.

Means are provided for effecting driving of one spiral 16 by driving an adjacent spiral 16 whether or not the shafts 17 thereof are in alignment with each other. Such means are shown generally by reference numeral 25 in FIG. 2, and one particular embodiment thereof is shown in more detail in FIGS. 4 through 7. In the embodiment of FIGS. 4 through 7, the drive means 25 comprises a collar 27 at the end of the shaft 17, having a plate 28 associated therewith. The plate 28 includes a section 29 which extends radially outwardly from the collar 27 and shaft 17, and a portion 30 which extends axially from the portion 29, toward its cooperating element 28. The two elements 28 thus provide a lost motion connection between adjacent shafts 17, that allow the shafts 17 to assume the angular relationship 23, which preferably is at least about 15°. FIGS. 4 through 7 show in detail the relative inter-engagements between the components 28 at various positions during the operation of the conveyor assembly 10.

Figure 8:
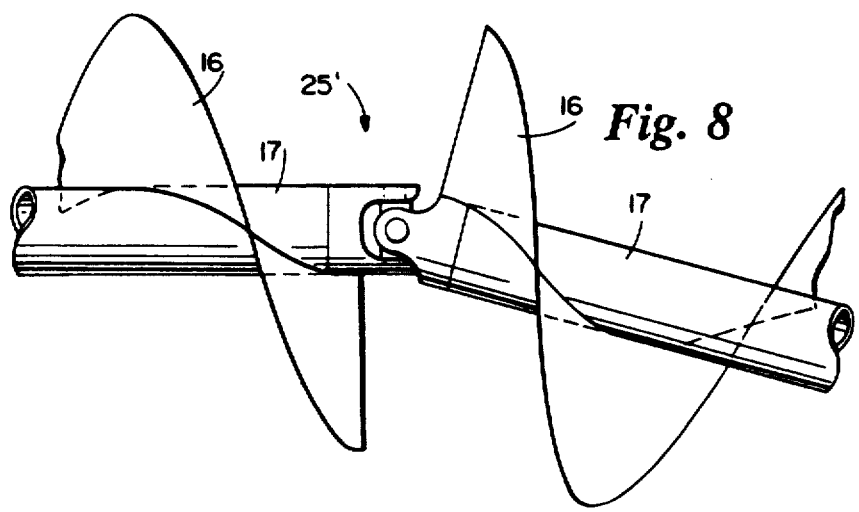
FIG. 8 is a view like that of FIG. 4 only showing a universal joint connection between the adjacent auger spirals rather than drive projections with a lost motion connection.

FIG. 8 illustrates a different means for effecting driving of one spiral 16 by driving an adjacent spiral 16 whether or not the shafts 17 are in alignment, such means indicated generally by reference numeral 25' and comprising a conventional HOOKES coupling (i.e. a universal joint).

Figure 9A:
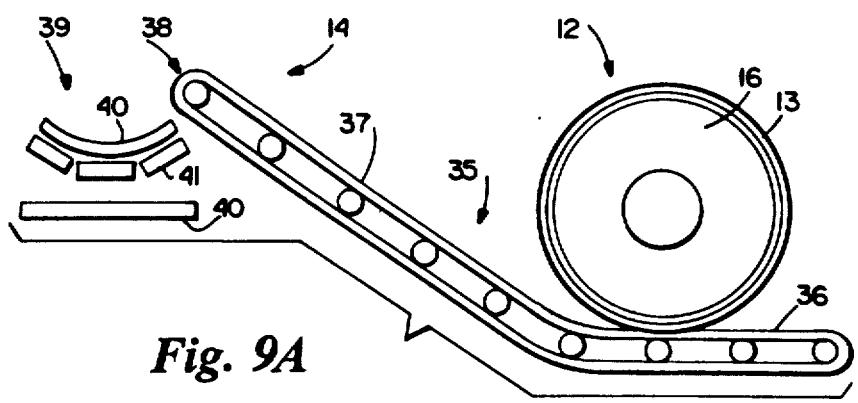

The discharge 14 may take a wide variety of forms. One particular form of discharge 14 is illustrated schematically in FIG. 9A, comprising a first conveyor 35 at the end of the housing 13 of the auger section closest to the mouth of the mind, the conveyor 35 preferably comprising a conveyor belt having a first generally horizontal surface 36 at the discharge of the last auger section 12, and then having an elevated portion 37 extending upwardly therefrom, and terminating at point 38 above a trough-shaped conveyor belt assembly 39 having a belt 40, and the rollers 41 comprising the trough shape at the top of the belt 40.

Another type of discharge that may be provided according to the invention is shown generally by reference numeral 14' in FIG. 9B, this conveyor comprising a conveyor belt having a generally horizontal lower portion 42, with an upwardly extending portion 43 therefrom, and then defining a loop 44, slots normally disposed in the conveyor belt being covered until it reaches the area of the trough-shaped conveyor 39, in which case they are uncovered and thereby the coal or other material being conveyed is deposited on the trough-shaped conveyor 39.

The motive force for powering the various auger sections 12 is provided by one or more motors—see motor 31 in FIG. 2—connected by a drive mechanism 32 to a shaft 17. The conventional drive motor 31 will typically be provided so that there is one every five or six auger sections 12.

FIG. 10 illustrates another embodiment according to the invention in which more than one auger conveyor is provided within each auger section 47. The auger sections 47 are utilized in place of the auger sections 12 in the FIGS. 1 and 2 embodiment. For the specific multiple auger structure illustrated in FIG. 10, first and second spirals 49, 50 are provided within a housing 48 of an auger section 47, the spirals 49, 50 rotatable with shafts 51, 52 respectively. Rotation thereof is effected by a drive rod or shaft 53 mounted on top of the housing 48, powered by an electric motor 54 or the like and connected via drive trains 55, 56 to the shafts 51, 52. The drive rod 53 is connected to a similar drive rod 57 mounted on an adjacent auger section 47, a conventional universal joint (HOOKES coupling) 59 being provided between the rods 53, 57. The rod 57 drives a pair of augers located within the auger section 47 with which it is associated, and typically would be connected by another universal joint 59 to a like rod 57 associated with yet another auger section 47. As in the FIG. 2 embodiment, one drive motor 54 typically would be associated with five or six auger sections 47. The drive elements 55, 56 would be associated with the shafts 51, 52 so that the spirals 49, 50 operate together to convey the mined material in the desired direction.

In the FIG. 10 embodiment, the end terminations of the housings 48 are not illustrated, but preferably are comparable to those in the FIGS. 2 and 3 embodiment.

Figure 11:
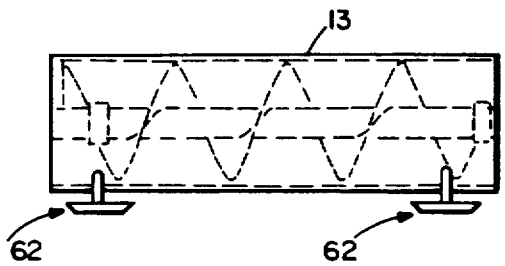
FIG. 11 is a side view of an exemplary auger section according to the invention having skids as a structure allowing movement thereof.

There also is provided associated with each of the auger sections 12 means for mounting the auger section housings 13 for facilitating movement of the auger section housings 13. One embodiment that such movement facilitating means can take is illustrated in FIGS. 11 and 12. In this embodiment, a plurality of skids 62, including front and rear sets, are provided to facilitate movement of the housings 13 along the mine floor, or other surface.

FIGS. 13 and 14 illustrate an alternative embodiment of the movement facilitating means that may be utilized with an exemplary auger housing 13 according to the invention. In this embodiment, two sets of wheels, comprising front wheels 64 and back wheels 65, are provided, each associated with an axle 66. Normally the wheels 64, 65 are not powered, but a powering unit can be provided every few housing sections 13.

Figure 15:
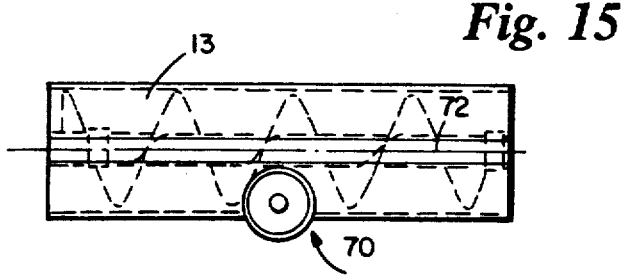
FIG. 15 is a side view of another embodiment of the auger housing section according to the invention having a single pair of wheels.
Figure 16:
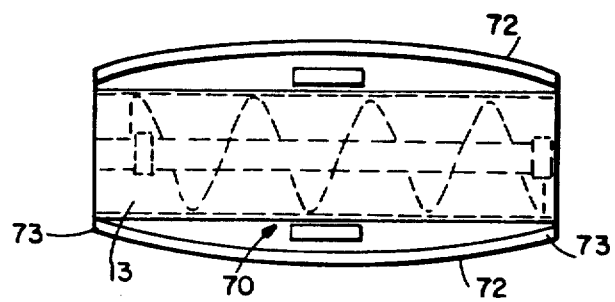
FIG. 16 is a top plan view of the section of FIG. 15.
Figure 17:
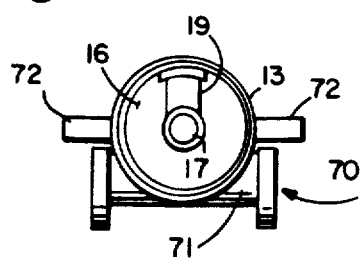
FIG. 17 is an end view of the structure of FIGS. 15 and 16.

The movement facilitating means illustrated in the embodiment of FIGS. 15 through 17 also comprises wheels, however their positioning and configuration are different. In this embodiment, a single set of wheels 70, mounted by an axle 71, is provided mounted at approximately a mid point of the housing 13. To provide for proper movement of the housing 13 through a mine bore, it is desirable to provide rub rails 72 on the opposite sides of the housing 13. The rub rails 72 are connected at the end 73 thereof to the housing 13 and are bowed outwardly at the center thereof, the outward bow of each rub rail 72—as clearly seen in FIGS. 16 and 17—being slightly past the horizontal-most extent of the wheels 70 so as to protect the wheels from engaging or binding against the bore side wall or the like.

Figure 18:
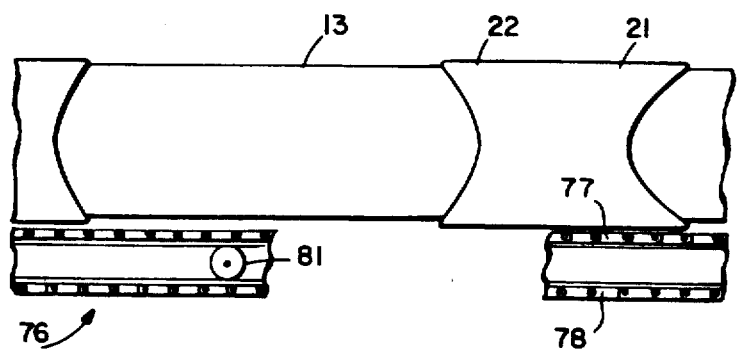
FIG. 18 is a side view of the auger sections of FIGS. 2 and 3 showing the mining chain drive structure.
Figure 19:
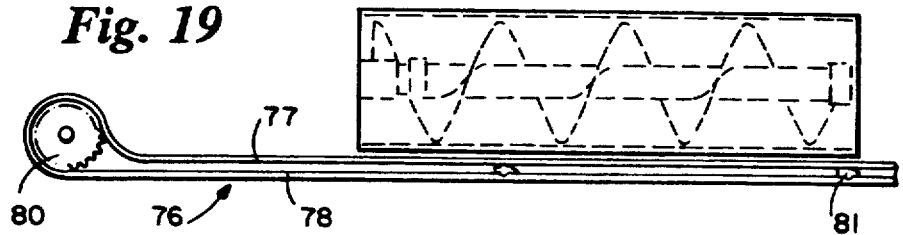
FIG. 19 is a schematic side view of the auger sections adjacent one of the ends thereof showing a drive sprocket and idler sprockets for the chain crawler.

The preferred means mounted on the auger section housings for facilitating—in fact effecting—movement of the auger section housings is illustrated in FIGS. 18 and 19, and also seen in FIG. 3. This structure comprises an essentially conventional mining conveyor chains 76, such as those sold by the Cincinnati Mine Machinery Company of Cincinnati, Ohio under the trade name "Cincinnati Conveyor Chains". Such chains have "sloppy" interconnections between links thereof, and therefore allow them to follow a non-linear, and in fact even a curved, pathway. In essence, the chain 76 acts as a crawler mechanism for transporting the housings 13. In this way, the chains are similar, per se, to the self-propelled conveyor drives utilized by Klockner-Becorit GmbH of Rackinghausen Federal Republic of Germany, for their product with the trade name of "Self-Propelled Conveyor With an Intermediate Drive". However, distinct from the Klockner-Becorit drive mechanism, the conveyor chains 76 according to the invention essentially continuously engage the ground (e.g. floor of the mine bore) and effect continuous movement of the conveyor assembly 10.

The drive chains 76 according to the invention include an upper flight 77, and a ground engaging lower flight 78, with drive sprocket—such as the sprocket 80 in FIG. 19—being provided at at least the front and rear of the drive chains 76, and with idler or drive sprockets 81 (see FIGS. 18 and 19) being provided at various positions along the length of the drive chains 76, mounted—as by a U-shaped pedestal 82—to a housing 13.

While the conveyor assembly 10 according to the present invention may be utilized for conveying a wide variety of materials in a wide variety of environments, it's particularly useful in association with a method of cutting and conveying mined material from a mine site through a non-linear bore. In such a method, at the mine site the material to be mined—such as coal—is cut by the cutting head 11. The auger sections 13 are substantially continuously moved into the bore toward the mine site, as by continuously powering the drive chain 76. Pivotal movement of adjacent auger sections 13 with respect to each other to conform to the non-linear bore is provided, being allowed by—for example—by the lost motion connection 25 between auger shafts 17 of adjacent spirals 16, and corresponding end terminations 21, 22 of the housings; and the mined material is continuously conveyed away from the mine site by rotating the spirals 16 of the auger sections 12, which engage the mined material 20 and move it toward the mine mouth. Rotation of one auger section shaft 17 by a drive motor 31 is transmitted to at least one other auger drive shaft 17 by the lost motion connection such as the projections 28, which positively effect driving yet allow an angular displacement 23 between the shafts 17.

It will thus be seen that according to the present invention a simple yet effective conveyor assembly is provided which is capable of taking advantage of the high conveyance capabilities of augers while allowing the conveying mechanism to travel non-linear paths. While the invention has been herein shown and described in what is presently conceived to be the most practical embodiment thereof, it Will be apparent to those of ordinary skill in the art that many modifications may be made thereof within the scope of the invention, which scope is to be accorded the broadest interpretation of the appended claims so as to encompass all equivalent assemblies and procedures.

What is claimed is:

1. A conveyor assembly comprising:

a plurlaity of auger sections, each section comprising a spiral mounted on a shaft, a housing surrounding the spiral and having two end terminations, and means for effecting driving of one spiral by driving an adjacent spiral whether or not the shafts are in line with each other;

means mounted on said auger section housings for facilitating moving said auger section housings;

said end terminations allowing relative pivotal movement between adjacent housing sections, at least in a horizontal plane; and said means for effecting driving of one spiral by driving of an adjacent spiral whether or not the shafts are in line with each other comprising axially and radially extending free projections from each adjacent shaft for abutting each other and spaced from each other in a dimension perpendicular to said shafts when said shafts are in alignment, providing a lost motion connection between said shafts when driven.

2. A conveyor assembly as recited in claim 1 wherein said housing end terminations comprises inter-engaging cylindrical section elements allowing relative rotational movement between adjacent housing sections of at least about 15° in a horizontal plane.

3. A conveyor assembly as recited in claim 2 further comprising stop means provided on said cylindrical section elements for preventing relative rotation beyond a certain point.

4. A conveyor assembly as recited in claim 1 further comprising bearing means for mounting said shafts within said housings, said bearing means comprising hanger type bearings.

5. A conveyor assembly as recited in claim 1 further comprising drive means for effecting driving of said shafts, said drive means comprising a plurality of different drives, one drive associated with every few auger sections.

6. An assembly as recited in claim 1 wherein said means for mounting said auger section housing for facilitating moving said auger section housing comprising means for continuously engaging the ground and for moving said auger section housing along the ground, and including conveyor chains having an upper flight connected said auger section housings, and a lower flight engagint the ground, with sloppy connections between the chain links so that the chains can bend in a horizontal plane; and a sprocket engaging said chain upper and lower flights at at least the beginning and end thereof.

7. A conveyor assembly as recited in claim 6 further comprising bearing means for mounting said shafts within said housings, said bearing means comprising hanger type bearings.

8. A conveyor assembly comprising:
   a plurality of auger sections, each section comprising a spiral mounted on a shaft, a housing surrounding the spiral and having two end terminations, and means for effecting driving of one spiral by driving an adjacent spiral whether or not the shafts are in line with each other;
   means mounted on said auger section housings continuously engaging the ground and for moving said auger section housings;
   said end termination allowing relative pivotal movement between adjacent housing sections, at least in a horizontal plane, and comprising inter-engaging cylindrical section elements allowing relative rotational movement between adjacent housing sections of at least about 15° in a horizontal plane; and
   drive means provided every few auger sections for effecting rotation of said auger sections.

9. A conveyor assembly as recited in claim 8 further comprising stop means provided on said cylindrical section elements for preventing relative rotation beyond a certain point.

10. A conveyor assembly as recited in claim 8 further comprising bearing mens for mounting said shafts within said housings, said bearing means comprising hanger type bearings.

11. A conveyor assembly comprising:
   a plurality of auger sections, each section comprising a spiral mounted on a shaft, a housing surrounding the spiral and having two end terminations, and means for effecting driving of one spiral by driving an adjacent spiral whether or not the shafts are in line with each other;
   means mounted on said auger section housings continuously engaging the ground and for moving said auger section housings; and
   said means mounted on said auger section housings for moving said auger section housings comprising conveyor chains having an upper flight connected said auger section housings, and a lower flight engaging the ground, with sloppy connections between the chain links so that the chains can bend in a horizontal plane; and a sprocket engaging said chain upper and lower flights at at least the beginning and end thereof.

12. A conveyor assembly as recited in claim 11 wherein said means for effecting driving include a universal joint connection between adjacent and spiral shafts.

13. A conveyor assembly as recited in claim 11 wherein said means for effecting driving of one sprial by driving an adjacent sprial whether or not the shafts are in line with each other comprises axially and radially extending integral free projections of from each adjacent shaft providing the lost motion connection between said shafts.

14. A conveyor assembly as recited in claim 11 further comprising bearing mens for mountign said shafts within said housings, said bearing means comprising hanger type bearings.

15. A conveyor assembly comprising:
   a plurality of auger sections, each section comprising a spiral mounted on a shaft, a housing surrounding the spiral and having two end terminations, and means for effecting driving of one sprial by driving an adjacent spiral whether or not the shafts are in line with each other;
   means mounted on said auger section housings for facilitating moving said auger section housings;
   said end terminations allowing relative pivotal movement between adjacent housing sections, at least in a horizontal plane;
   said means for effecting driving of one spiral by driving of an adjacent spiral whether or not the shafts are in line with each other comprising axially and radially extending projections from each adjacent shaft providing a lost motion connection between said shafts; and
   drive means for effecting driving of said shafts, said drive means comprising a plurality of different drives, one drive associated with every few auger sections.

* * * * *